United States Patent
Ramasamy et al.

(10) Patent No.: US 10,736,118 B2
(45) Date of Patent: *Aug. 4, 2020

(54) METHOD AND APPARATUS FOR AN ACCELEROMETER ASSISTED CONTROL SYSTEM FOR A RECONFIGURABLE ANTENNA COMMUNICATION DEVICE

(71) Applicant: Dell Products, LP, Round Rock, TX (US)

(72) Inventors: Suresh K. Ramasamy, Austin, TX (US); Stephen Shiao, Coral Springs, FL (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,842

(22) Filed: May 24, 2019

(65) Prior Publication Data

US 2019/0281597 A1    Sep. 12, 2019

Related U.S. Application Data

(63) Continuation of application No. 15/872,969, filed on Jan. 16, 2018, now Pat. No. 10,321,463.

(51) Int. Cl.
*H04N 21/436* (2011.01)
*H04W 72/04* (2009.01)
*H04W 72/08* (2009.01)
*H04B 7/06* (2006.01)

(52) U.S. Cl.
CPC ........ *H04W 72/048* (2013.01); *H04B 7/0617* (2013.01); *H04W 72/085* (2013.01); *H04W 72/0446* (2013.01)

(58) Field of Classification Search
CPC .... H04W 72/048; H04N 21/436; H04B 17/00
See application file for complete search history.

(56) References Cited

U.S. PATENT DOCUMENTS

| | | | |
|---|---|---|---|
| 5,682,529 A | 10/1997 | Hendry | |
| 8,289,688 B2 | 10/2012 | Behar | |
| 10,321,463 B1 * | 6/2019 | Ramasamy | ......... H04W 72/048 |
| 2006/0234663 A1 | 10/2006 | Wilhoyte | |
| 2011/0117856 A1 | 5/2011 | Valuppillai | |
| 2014/0153418 A1 | 6/2014 | Hariharan | |
| 2014/0184440 A1 | 7/2014 | Park | |

(Continued)

*Primary Examiner* — Myron Wyche
(74) *Attorney, Agent, or Firm* — Prol Intellectual Property Law, PLLC; H. Kenneth Prol

(57) ABSTRACT

A wireless adapter front end for an information handling system may comprise a wireless adapter for receiving content via a transceiving antenna configurable to have a plurality of antenna radiation patterns, and a controller. The controller may execute code instructions to receive a trigger input indicating decreased signal strength, measure RSSI variance of the wireless link, measure a rate of mobility of the information handling system determined from accelerometer data or velocity data, identify an allotted training duration time period associated with the rate of mobility and RSSI variance, identify an optimal antenna pattern associated with a highest quality link within the allotted training duration time period, and instruct the transceiving antenna to operate according to the optimal antenna pattern.

20 Claims, 6 Drawing Sheets

(56) References Cited

U.S. PATENT DOCUMENTS

2014/0206297 A1 7/2014 Schlub
2017/0181050 A1 6/2017 Alfred
2018/0131990 A1 5/2018 Desclos

* cited by examiner

METHOD AND APPARATUS FOR AN ACCELEROMETER ASSISTED CONTROL SYSTEM FOR A RECONFIGURABLE ANTENNA COMMUNICATION DEVICE

This application is a continuation of prior application Ser. No. 15/872,969 entitled "METHOD AND APPARATUS FOR AN ACCELEROMETER ASSISTED CONTROL SYSTEM FOR A RECONFIGURABLE ANTENNA COMMUNICATION DEVICE," filed on Jan. 16, 2018, which is assigned to the current assignee hereof and is incorporated herein by reference in its entirety.

FIELD OF THE DISCLOSURE

The present disclosure generally relates to transceiving cellular and Wi-Fi data streams simultaneously via a plurality of antennas in a mobile information handling system. The present disclosure more specifically relates to choosing between a plurality of antenna pattern training methods based on received measurements or indicators of current operational conditions of an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include transceiving antennas for communication of cellular, Wi-Fi, GPS and Bluetooth signals.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
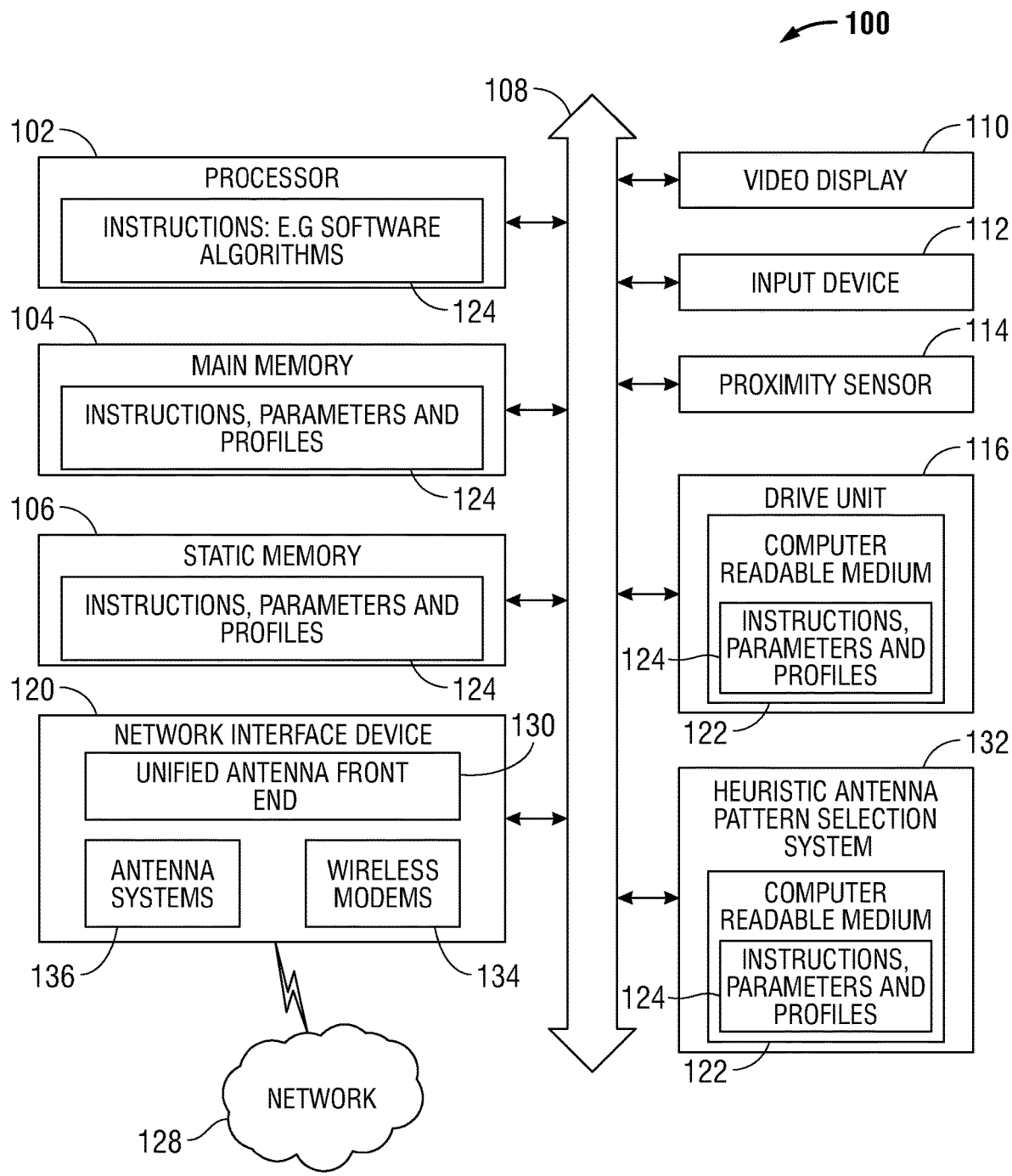
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the abilities of these mobile information handling systems to quickly and reliably access high quality data signals increase in demand. Mobile information handling systems in embodiments of the present disclosure address this need by employing a plurality of antenna systems for communication via wireless links operating on a variety of radio access technologies (RAT). For example, a mobile information handling system in an embodiment of the present disclosure may employ separate antenna systems for WLAN signals, including signals adhering to standards such as, for example, IEEE 802.11 Wi-Fi, IEEE 802.11ad WiGig, and/or IEEE 802.15 WPAN, and WWAN signals, including signals adhering to 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like. In other aspects, several antenna systems may be available for each RAT to enable aggregated data communications such as via plural multiple in, multiple out (MIMO) streams to enhance bandwidth or reliability.

Current configurations involving a plurality of antenna systems operating on a variety of RATs encounter potential problems associated with interference between each of the antennas, and incompatibility between antenna systems manufactured by different upstream suppliers. For example, a cellular modem developed by a first upstream manufacturer may be incompatible or unable to directly communicate with a Wi-Fi modem developed by a second upstream manufacturer. As another example, a WLAN modem developed by a first upstream manufacturer may be incompatible or unable to directly communicate with a WWAN modem developed by a second upstream manufacturer. Embodiments of the present disclosure address this issue by providing a unified antenna front end module capable of directing operations of each antenna system within the mobile information handling system.

Systems capable of directing operations of multiple antenna systems not capable of communicating directly with one another in current mobile information handling systems may involve a module residing within the BIOS of the information handling system and executed by the information handling system operating system directing operation of each antenna system. Such a configuration is overly burdensome, depletes operating system resources, and often presents latency issues. Embodiments of the present disclosure address this issue by employing a microcontroller operably connected to each of the antenna systems to execute instructions of the unified front end module and/or the heuristic antenna pattern selection system, thus eliminating the dependency on the operating system.

Operating the plurality of antenna systems within the mobile information handling system in embodiments of the present disclosure further present issues relating to colocation interference between the antennas. Co-location interference issues arise when two antennas transceiving two different signals are placed in close proximity to one another, and the transmission or reception of one of the signals causes extreme interference to the other signal and/or vice versa, such that the quality of one or more of the signals drops. Embodiments of the present disclosure address colocation issues by altering the radiation pattern of one or both signals.

A unified front end module in embodiments of the present disclosure may alter the radiation pattern of one or both signals by coupling one of the signals to a parasitic antenna and controlling phase shifting via a microcontroller executing instructions of a heuristic antenna pattern selection system. The parasitic antenna may be used by a tuning and phase shift network within a unified front end module to direct phase shift such that the parasitic element may influence the current, thereby steering the shape of the RF antenna pattern for one or more transceiving antennas. Additionally, RF pattern shape control may be implemented in some embodiments by tuning for advanced open loop using feedback (AOL) or closed loop using power detection (CL) circuit. Antenna port termination or tuning may be altered to enhance transmission pattern diversity. In another aspect, one of the antenna port terminations or tuning may be altered to increase reflection to increase interference rejection for one or other portions of a transceiving antenna or a parasitic antenna.

Different antenna pattern configurations may be more optimal than others in embodiments described herein, dependent upon operating conditions of the information handling system. For example, quality of wireless links established via an antennas transceiving according to a given radiation pattern may vary as the positional configuration of the information handling system changes, or as the channel conditions of the wireless link vary. In embodiments of the present disclosure, the information handling system may include a base chassis movably connected to a display chassis such that the display chassis may move through roughly 360 degrees of movement from the base chassis. For example, the display chassis may be placed in a closed configuration such that it abuts the keyboard surface of the base chassis (zero degrees), in an open configuration (rotated between zero and 180 degrees away from the base chassis), and a tablet configuration (rotated between 180 degrees and 360 degrees away from the base chassis). The most optimal antenna pattern for a first one of these positional configurations may be different than the most optimal antenna pattern for a second one of these positional configurations. Thus, a method is needed to detect a change in configuration, and then determine an optimal antenna pattern for the current positional configuration of the information handling system.

Embodiments of the present disclosure address this issue by performing an antenna pattern training session upon receipt of an indication of a change in positional configuration or a drop in signal quality below a threshold value, in order to determine the most optimal antenna pattern configuration for current operating conditions. The heuristic antenna pattern training system in embodiments of the present disclosure may operate to test a plurality of possible antenna configurations by transceiving from an antenna according to a first pattern, testing one or more signal quality parameters (e.g. RSSI) on the link transceived according to the first pattern, repeating these steps for each available antenna pattern, then identifying the pattern associated with the highest signal quality parameter as the most optimal. The heuristic antenna pattern training system in embodiments may use a non-dedicated method, or other methods in order to perform such optimization. A dedicated method in one aspect could involve all sampling of the signal quality parameters for each of the plurality of antenna patterns occurring in a time period set aside in between the transmission or receipt of content data according to usual operation of the information handling system. Use of such a dedicated training method in some embodiments may cause latency of transmission and receipt of data according to normal (non-training) operations of the information handling system. Signal quality for the transmission and receipt of data under non-training operations (e.g. data not transceived for the sole purposes of determining signal quality) may not be impacted by a training session in such an embodiment.

Embodiments of the present disclosure may include use of a non-dedicated method. A non-dedicated method may involve sampling of the signal quality parameters for each of the plurality of antenna patterns occurring simultaneously with the transmission or receipt of content data according to usual operation of the information handling system. Use of such a non-dedicated training method in some embodiments may allow users to continue to transceive all content data during the training session, but could also cause a fluctuation in the quality of the signal transceived during the training session as different antenna patterns are tested.

The link quality associated with each of the antenna patterns tested during a non-dedicated method may be affected by one or more environmental factors or operating conditions. If the environmental factors or operating conditions do not change between the testing of the first antenna pattern and the next antenna pattern, comparison of the link qualities associated with each pattern may provide a clear indication of which of those antenna patterns will likely yield the highest quality link while the environmental factors or operating conditions remain the same. In contrast, if the environmental factors or operating conditions change between the testing of the first antenna pattern and the next antenna pattern, comparison of the link qualities will provide a less accurate determination of the optimal antenna pattern, because the change in environmental factors or operating conditions may affect the link quality more than the alteration of the antenna patterns. In such a scenario, taking more measurements over a longer period of time may provide enough data to isolate the effect of the alteration of the antenna patterns from the effect of the environmental factors or operating conditions on the link quality, and to then identify an optimal antenna pattern. Thus, as the impact of the environmental factors or operating conditions on signal quality increases, so too may the time required to test the plurality of antenna patterns increase. For example, mobility of a device and antenna systems needing training may continuously impact the capacity of an antenna training system to determine an optimal antenna radiation pattern choice. However, in other circumstances, radio frequency conditions may be sub-optimal but stable requiring more time to determine an optimal radiation pattern, but a better radiation pattern may be determined.

In order to determine the magnitude of the impact of the environmental factors or operating conditions on signal quality, the heuristic antenna pattern training system in embodiments of the present disclosure may receive and/or analyze a history of RSSI measurements taken over time from the WLAN or WWAN module as an RSSI variance for example. RSSI variance may increase as the magnitude of the impact of the environmental factors or operating conditions on signal quality increases. For example, scattering effects, interferences, or mobility of the antenna systems may all contribute to RSSI variance.

Training or testing to determine a most optimal antenna configuration in embodiments of the present disclosure may be more effective in some scenarios than others. Rapid geographic movement of the information handling system alone can cause the quality of the link to change over time to a greater degree. In such a scenario, it may not be effective to gather data adequate to isolate the effect of the alteration of the antenna patterns from the effect of the environmental factors or operating conditions on the link quality, regardless of the period of time over which the training occurs. Because signal quality may be decreased during a training session as suboptimal antenna configurations are tested, the heuristic antenna pattern training system in embodiments of the present disclosure may limit or cap the amount of time allotted to a training session as the movement of the information handling system increases. In such a way, the heuristic antenna pattern training system may increase link quality by identifying an optimal antenna pattern when the likelihood of identifying such an optimal pattern is high, and limit the amount of time and resources dedicated to identifying the optimal antenna pattern when the likelihood of success decreases, based on movement of the information handling system.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the heuristic antenna pattern selection system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input, and a GPS location circuit 114 capable of measuring a geographic location in three-dimensions, a velocity, and an acceleration of a mobile, semi-mobile, and/or stationary information handling system. The GPS location circuit 114 in an embodiment may further include general capabilities of an accelerometer, including an ability to detect positional configuration of a base chassis of the information handling system with respect to a display chassis of the information handling system. The information handling system 100 can also include a disk drive unit 116.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 130 with transmitter/receiver circuitry, modem circuitry, one or more unified radio frequency front end circuits, one or more wireless controller circuits, amplifiers, antenna systems 136 and other radio frequency subsystem circuitry 130 for wireless communications via multiple radio access technologies. Each radiofrequency subsystem 130 may communicate with one or more wireless technology protocols.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links. The wireless network may have a wireless mesh architecture in accordance with mesh networks described by the wireless data communications standards or similar standards in some embodiments but not necessarily in all embodiments.

Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service. With the licensed wireless radio frequency communication capability, the radiofrequency subsystem 130 may operate on a licensed WWAN wireless radio with authorization for subscriber access to a wireless service provider on a carrier licensed frequency band.

In other aspects, the information handling system 100 operating as a mobile information handling system may operate a plurality of wireless adapters 120 for concurrent radio operation in one or more wireless communication bands. The plurality of wireless adapters 120 may further share a wireless communication band or operate in nearby wireless communication bands in some disclosed embodiments. Further, harmonics, scattering, and other effects may impact wireless link operation when a plurality of wireless links are operating concurrently as in some of the presently described embodiments. The proximity of concurrent radio transmission or reception in a shared band or interfering bands precipitates a need to assess concurrently operating antenna systems and potentially make antenna system adjustments according to the antenna optimization system of the present disclosure.

The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 136 for 5G small cell WWAN, Wi-Fi WLAN or WiGig connectivity and one or more additional antenna system transmitters 136 for macro-cellular communication. The radio frequency subsystems 130 include wireless controllers to manage authentication, connectivity, communications, power levels for transmission, buffering, error correction, baseband processing, and other functions of the wireless adapter 120.

The radio frequency subsystems 130 of the wireless adapters may also measure various metrics relating to wireless communication pursuant to operation of an antenna optimization system as in the present disclosure. For example, the wireless controller of a radio frequency subsystem 130 may manage detecting and measuring received signal strength levels, bit error rates, signal to noise ratios, latencies, jitter, and other metrics relating to signal quality and strength. In one embodiment, a wireless controller of a wireless interface adapter 120 may manage one or more radio frequency subsystems 130. The wireless controller also manages transmission power levels that directly affect radio frequency subsystem power consumption as well as transmission power levels from the plurality of antenna systems 136. The transmission power levels from the antenna systems 136 may be relevant to specific absorption rate (SAR) safety limitations for transmitting mobile information handling systems. To control and measure power consumption via a radio frequency subsystem 130, the radio frequency subsystem 130 may control and measure current and voltage power that is directed to operate one or more antenna systems 136.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device or wireless adapter 120.

The information handling system 100 can include a set of instructions 124 that can be executed to cause the computer system to perform any one or more of the methods or computer based functions disclosed herein. For example, instructions 124 may execute a heuristic antenna pattern selection system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the heuristic antenna pattern selection system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 116 and static memory 106 also contain space for data storage. Further, the instructions 124 may embody one or more of the methods or logic as described herein. For example, instructions relating to the heuristic antenna pattern selection system 132 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the heuristic antenna pattern selection system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The heuristic antenna pattern selection system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a heuristic antenna pattern selection system 132 that may be operably connected to the bus 108. The heuristic antenna pattern selection system 132 computer readable medium 122 may also contain space for data storage. The heuristic antenna pattern selection system 132 may perform tasks related to receiving trigger inputs indicating operating or environmental conditions of the information handling system, determining to which antenna pattern WLAN, and/or WWAN transceiving antennas should be set in order to optimize performance of all currently transceiving signals based on the trigger inputs.

In an embodiment, the heuristic antenna pattern selection system 132 may communicate with the main memory 104, the processor 102, the video display 110, the alpha-numeric input device 112, the GPS location circuit 114, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
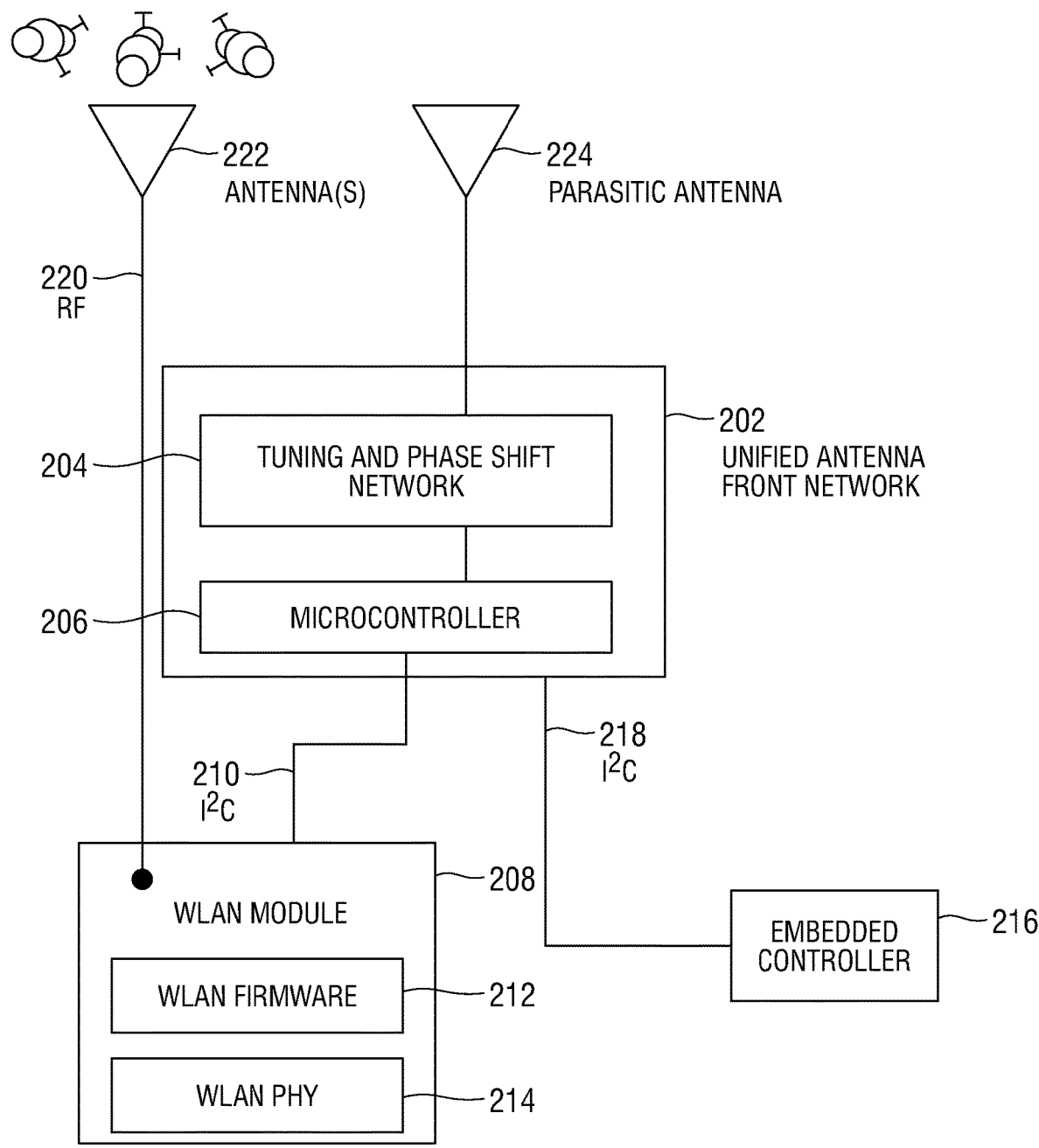
FIG. 2 is a block diagram illustrating an RF antenna front end that may execute instructions of a heuristic antenna pattern selection system according to an embodiment of the present disclosure.

FIG. 2 is a block diagram illustrating an RF antenna front end that may execute instructions of a heuristic antenna pattern selection system according to an embodiment of the present disclosure. An information handling system in an embodiment may include one or more RF antenna front ends, and an RF antenna front end may be operably connected to one or more antenna systems and one or more wireless modems. For example, as shown in FIG. 2, an information handling system in an embodiment may include a unified antenna front end module 202 (front end module) operably connected to a WLAN module 208 acting as a wireless WLAN modem, a transceiving antenna 222, and a parasitic antenna 224. WLAN modules and/or antennas (e.g. 202, 208, 222, and 224) in some embodiments of the present disclosure may operate to process and transceive signals including signals adhering to standards such as, for example, IEEE 802.11 Wi-Fi, IEEE 802.11ad WiGig, and/or IEEE 802.15 WPAN. In other embodiments, the module 208 may be a WWAN module acting as a wireless WWAN modem, and may operate to process and transceive signals including signals adhering to 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like. References to the unified WLAN front end module 202 herein may be intended to include a WLAN, WWAN, Wi-Fi, or LTE front end module as well. The unified WLAN front end module 202 may work to optimize antenna radiation patterns, tune radio signals, and/or dynamically alter the transmission power of radio signals in order to optimize performance of all transceiving signals and to comply with FCC SAR regulations.

In the embodiment shown in FIG. 2 for illustration, a WLAN antenna 222 is shown working with a WLAN radio module 208. The embodiment shown in FIG. 2 may also be applied to a WWAN antenna and WWAN radio module in other embodiments. In an example aspect, the RF antenna front end 202 may include a microcontroller 206 which may operate a heuristic antenna pattern selection system to select a training method for optimizing antenna radiation pattern, in response to antenna trigger inputs including WLAN or WWAN radio performance inputs, GPS or accelerometer data, antenna configuration data, and other sensor data. In other aspects, the microcontroller 206 may be a separate microprocessor or may be integrated into another portion of a wireless adapter such as that shown herein for an information handling system. For example, in some aspects, the microcontroller 206 may be integrated into one or more wireless radio modules such as the WLAN module 208. In yet other aspects, some or all of the operations of the microcontroller 206 may be distributed across microprocessing capabilities embedded within several portions of the wireless adapter of an information handling system. In this way, the operation of the microcontroller 206 may be operating system independent when optimizing a WLAN and/or WWAN antenna configuration.

In some embodiments, antenna systems of the information handling system may include a parasitic antenna 224 which may permit control over the antenna radiation pattern of the WLAN antenna 222. Similar parasitic element interfaces may be used to control radiation patterns for WWAN antennas as applicable. A microcontroller 206 may provide for control over phase shifting the coupling currents to the parasitic antenna 224. Activation of increased phase shift to the parasitic antenna 224 or decreased phase shift of other parasitic elements or other transmitting device may be used to steer an antenna transmission pattern by the WLAN front end module 202 operating the tuning and phase shift network 204 in various embodiments. For example, the WLAN antenna 222 may be embedded in a metal chassis such as a display screen housing or base housing for an information handling system. Some or all of a metallic chassis, hinge, bezel, or other structural component of the information handling system may act as the parasitic antenna 224, providing RF radiation with phase shift for transceiving WLAN signals. The parasitic antenna 224 may be used by the tuning and phase shift network 204 to direct phase shift such that these parasitic elements may influence the current, thereby steering the shape of the RF antenna pattern for the WLAN antenna 222. It is understood that any number of WLAN antennas may be deployed with the front end module 202 or by the information handling system in other embodiments although the present embodiment describes one WLAN antenna system. Similarly, it is understood that the above discussion may be applied to WWAN antennas, Wi-Fi antennas, and/or LTE antennas in other embodiments.

In an example embodiment of antenna steering control implemented via the tuning and phase shift network 204, impedance or capacitance tuning may be executed to adjust the ratio of impedance to capacitive reactance for one or more antenna systems to adjust phase shift of RF current coupling to influence directivity patterns for the WLAN antenna 222 or any other WLAN antenna systems deployed in an information handling system. In an example embodiment, a variable capacitor may be used to alter the ratio of impedance to capacitive reactance. For example, a WLAN 2.4 or 5 GHz transmitting antenna 222 operating several parasitic antenna elements may decrease rejection between the WLAN antenna 222 and WWAN antennas or other WLAN antennas. This may occur, for example, through antenna radiated pattern coupling paths through the parasitic antenna 224 to alter the antenna pattern or direction of the WLAN 2.4 or 5 GHz transmitter antenna system 222. The tuning and phase shift network 204 of the present embodiment may implement pattern decorrelation by finding the radiation pattern pair between the main and auxiliary antenna ports with orthogonal directivity that enhances the RSSI, SNR or other signal quality indication using the firmware or other algorithms of the tuning and phase shift network 204. By using a parasitic coupling element with a variable impedance termination and which may be triggered by a switch, the microcontroller 206 may control the directionality of the transmission signal to thereby cause a shift of transmission pattern. The tuning and phase shift network 204 may control this tuning for the antenna ports for the WLAN antenna 222 to alter RF transmission pattern and potentially improve RSSI, SNR, MCS or other performance factors.

In another example embodiment of coexistence control implemented via the WLAN unified RF antenna front end 202, adjusting the WLAN band in which the WLAN antenna 222 is transmitting and/or receiving may effectively decrease deleterious effects of colocation interference between the WLAN antenna 222 and a WWAN antenna. For example, if colocation interference is caused by simultaneous transceiving of a WWAN signal in the 2.5 GHz band and a WLAN signal in the mid-frequency range of the 2.4 GHz band in an embodiment, the WLAN unified RF antenna front end 202 may alter the frequency within the 2.4 GHz band at which the WLAN antenna 222 is transceiving. Adjusting the frequency within the 2.4 GHz band at which the WLAN antenna 222 is transceiving in such an embodiment may decrease the deleterious effects of colocation interference between the WLAN antenna 222 and a WWAN antenna.

Additionally, RF pattern shape control may be implemented in some embodiments by tuning for advanced open loop using feedback (AOL) or closed loop using power detection (CL) circuit. Antenna port termination or tuning may be altered to enhance transmission pattern diversity. In another aspect, one of the antenna port terminations or tuning may be altered to increase reflection to increase interference rejection for one or other portions of the WLAN antenna 222 or the parasitic antenna 224. Further the OL, AOL and CL may be tuned at an antenna port termination to reduce output power to meet SAR body exposure limitations. A tuning and phase shift network 204 may use a tunable capacitor integrated circuit to alter the antenna port termination and tune in response to antenna triggers processed by the microcontroller 206 such as from a proximity sensor. The microcontroller 206 or the tuning and phase shift network 204 may use antenna trigger feedback data to conduct the advanced open loop (AOL) tuning operations in aspects of the embodiment herein.

In another example embodiment of RF shape pattern control, phase shift using aperture tuning may shift the WLAN antenna's 222 directivity in that radiofrequency radiation may be directed to occur at a greater proportion on the WLAN antenna 222 or at a greater level on one or more parasitic antennas 224 or other parasitic elements such as the antenna system board, traces, or chassis of the information handling system which may participate in radio frequency transmission and reception. Radiation pattern may be coupled into system board, traces which may introduce or increase noise floor that may impact the RSSI, SNR, MCS or other signal quality indications. Degradation of the RSSI or other metrics detected by the microcontroller 206 will be used to move antenna pattern directivity away from the system board to enhance RSSI and other link performance metrics thereby achieving a closed loop power control and pattern adaptation.

In yet another example embodiment of RF shape pattern control, selection of open circuit, advanced open circuit, or a closed loop may be implemented or activated by the microcontroller 206 to alter RF transmission shape patterns. Referring to AOL (Advance open loop using feedback) or CL (Closed loop using RSSI and other metrics detected form a wireless adapter) tuning, either antenna port termination or tuning may be altered to improve or enhance pattern diversity or to increase reflection to increase rejection and decrease output power to meet SAR exposure limits. A tuning and phase shift network 204 may use a tunable capacitor integrated circuit, in conjunction with the parasitic antenna 224, to alter the WLAN antenna 222 port termination, tuning, phase shift, or any combination based on the control from the microcontroller 206 in response to antenna trigger data. For example, the microcontroller 206 may thereby conduct advanced open loop tuning using feedback from a proximity sensor or other sensor inputs to change pattern directivity or antenna tuning using impedance and aperture tuning techniques.

The WLAN antenna 222 RF shape pattern adjustments may include modification of only one WLAN antenna, or any or all WLAN antennas in operation according to embodiments described herein. Examples of antenna configuration modifications that may be implemented as RF shape pattern control include tuning at the antenna ports with varying impedance terminations to alter the phase shift of coupling currents and directionality of a particular antenna system, or decoupling networks activated between multiple WLAN antenna ports, or between a WLAN antenna port and a WWAN antenna port operating concurrently to enhance rejection of signals between the ports. Combination of the RF shape pattern controls may be utilized including these examples or any combination by the tuning and phase shift network 204 in connection with the microcontroller 206 and WLAN radio module 208 or WWAN module 202. Further, additional antenna control measures may be employed including turning off or turning down power to some antenna systems and using alternative options such as between parallel wireless links from a MIMO set of wireless links with several parallel data streams on wireless connections.

The microcontroller 206 further may communicate with a variety of additional antenna trigger data sources. For example, the microcontroller 206 may be connected to receive usage mode physical configuration data from an embedded controller (EC) 216. EC 216 may detect the orientation and configuration of an information handling system and the relative position and orientation of the one or more antenna systems, such as 222, relative to the physical configuration of the information handling system. EC 216 may work in connection with a sensor hub connected to various motion sensors, orientation sensors, and position sensors to detect the relative physical configuration and orientation of portions of the information handling system relative to other portions of the configurable information handling system. Example sensors may include GPS circuits, accelerometers, digital gyroscopes, hinge angle detectors, and other orientation sensors. In an example embodiment, the orientation sensors may be coordinated with the EC 216 via a processor which may also be operatively coupled to the WLAN antenna front end module 202 in a wireless adapter of the information handling system via a bus to permit communication of data wirelessly transceived via the WLAN antenna front end module 202 and WLAN radio module 208. In other example embodiments, the orientation sensors may be coordinated with the EC 216 via a processor which may also be operatively coupled to a Wi-Fi antenna front end module in a wireless adapter of the information handling system via a bus to permit communication of data wirelessly transceived via a Wi-Fi antenna front end module and Wi-Fi radio module 208.

Orientation sensors may provide sensor data that serves as all or part of some of the inputs to EC 216 described. EC 216 may gather sets of data from some or all of a variety of orientation sensors, proximity sensors, docking sensors or the like as shown for use with a variety of usage modes for various physical configurations. A sensor hub may be located within wireless interface adapter or elsewhere on the motherboard of the information handling system (not shown). Orientation sensor types include motion sensors and other sensors including one or more digital gyroscopes, accelerometers, and magnetometers. Motion sensors may also include reference point sensors. For example, a geomagnetic field sensor may determine position of a display screen relative to a keyboard of a laptop or a 360 degree convertible device. This positional information may provide x-axis, y-axis, and z-axis positional information of the information handling system relative to magnetic north pole, and therefore a reference point of the device position. In one embodiment, two geomagnetic field sensors provide x-axis, y-axis, and z-axis positional information for a keyboard and display screen or for each display screen housing of a dual display housing information handling system according to various embodiments herein. With sensor data from any of several combinations of the above sensors, the system determines the relative position of the two housings to one another in orientation, such as two display screen housings or a display screen and keyboard housing.

Also, a digital gyro and accelerometer may be used to detect motion and changes in position. These sensors may provide a matrix of data. In an example embodiment, the azimuth or yaw, pitch, and roll values of the device are indicated by the raw sensor data. The orientation data may be relevant to relative locations of antennas with an information handling system such as those located in different hinged portions in one embodiment. In connection with a reference point, such magnetic north as provided in one embodiment by a geomagnetic field sensor, the azimuth can be determined as a degree of rotation around a z-axis. Further hinge azimuth angle may be discussed further below. In an embodiment, the azimuth may be the value of the z-axis relative to the device y-axis as positive angle values between 0° and 360°. It is understood that a different range of values may be assigned in different embodiments of a laptop, 360 degree convertible device, or even a tablet computing system which may have a plurality of display screens or a single, foldable display screen across two housings.

Based on a reference point such as provided by a geomagnetic field sensor, pitch may be determined as a degree of rotation around the x axis. In an example embodiment, the angle values may range from positive 180° to negative 180° relative to the y-axis, although other value ranges may be assigned instead. Roll is also based on the reference value, for example that established by a geomagnetic sensor. Roll may be considered to be rotation about the y-axis and its values may range from positive 90° to negative 90°. Again, the value ranges assigned can vary for each of the azimuth, pitch, and roll as long as a set of values is used to define orientation parameters in three dimensional space.

The orientation sensor data may be processed partly by a sensor hub or accumulator, which may be EC 216, to provide orientation data for the information handling system. The sensor hub performs a fusion of data signals received from either a single sensor or multiple sensor devices. In one example embodiment, the sensor hub is an independent microcontroller such as the STMicro Sensor Fusion MCU.

In an example embodiment, the information handling system may be a convertible laptop that may be operated in a plurality of usage mode configurations. The convertible laptop may include a plurality of housings connected by a hinge that may be oriented in a variety of ways with respect to one another or in space relative to a user. EC 216 may be used to detect a usage mode for a physical configuration of the convertible laptop in an example embodiment. For example, a laptop usage mode may include a display in one housing and a keyboard in another housing. Physical configurations may include a laptop mode whereby the display is viewable above the keyboard in a traditional laptop configuration in one example embodiment. In another physical configuration embodiment, the display may be folded around to lay flat and adjacent to the housing of the keyboard such that a laptop physical configuration may be detected for the display housing relative to the keyboard housing. Additionally, the physical usage mode configuration of the convertible laptop information handling system may also have impact on the orientation and location of antennas and antenna transmission patterns for the one or more WLAN antennas 222.

EC 216 may be connected to microcontroller 206 via a data bus for reporting physical configuration data for various usage modes detected. In one example embodiment, microcontroller 206 may maintain a master-slave relationship with antenna trigger input data sources. Microcontroller 206 may poll antenna trigger input data from the WLAN module 208 via I²C data line 210, and from the EC 216 via I²C data line 218. The antenna trigger data providers (e.g. EC 216, and WWAN module 202) may respond to polling queries from the microcontroller 206 with reports related to measurements or status determinations. Further, antenna trigger data provider slave devices such as EC 216, and WLAN module 208, RFICs in the wireless adapter, or other antenna trigger data providers may also obtain attention of the microcontroller 206 via GPIO interrupt operation along the same or different communication lines in some embodiments. Upon an event, an interrupt signal to the microcontroller 206 may cause the microcontroller 206 to configure the data lines to operate as an I²C communication line and query the slave antenna trigger data device to provide the event information.

In one example embodiment, an I²C line may be used as communication line 210 to report WLAN signal condition data such as received signal strength (RSSI), signal to noise ratio (SNR), modulation coding scheme index (MCS), bit error rates (BER), transmission power levels, reception power levels, TX/RX status, data packet volumes and other data reported by the WLAN radio module 208 to the microcontroller 206. Further, the microcontroller 206 or other aspects of the WLAN antenna front end module 202 may provide notification of operations to switch between the WLAN antenna 222 and an auxiliary WLAN antenna or to provide power cutback requirements to the WLAN module 208 or the WWAN module 202 depending on the antenna trigger inputs received by the microcontroller 206. Control or notification data from the microcontroller 206 or WLAN antenna front end module 202 may be transmitted along communication line 210 to the WLAN module 208. Detection of WLAN signal conditions and receipt of control or notification commands or data from the microcontroller 206 may be processed by the WLAN radio module 208 in the firmware layer 212 and may be executed in the physical layer 214. WLAN radio module 208 may command power levels or data operations with the WLAN antenna 222 via RF line 220.

Antenna systems, such as WLAN antenna 222, may be a variety of antenna systems that are mounted within the information handling system or may utilize peripheral antenna systems connected to the WLAN antenna front end 202. In some example embodiments, antenna system 222 may utilize an antenna device installed on an information handling system with a primary dipole radiator or antenna aperture. In other embodiments, antenna system 222 may also incorporate RF radiator surfaces such as portions of the information handling system chassis, motherboard, wiring/traces, or case components as aspects of the antenna system 222. Some of these RF radiation effects may not be intentional. In yet other example embodiments, antenna system 222 may utilize auxiliary devices such as cords or cabling external to the information handling system. Various embodiments of the unified antenna front end module(s) shown in FIG. 2 are contemplated.

Figure 3:
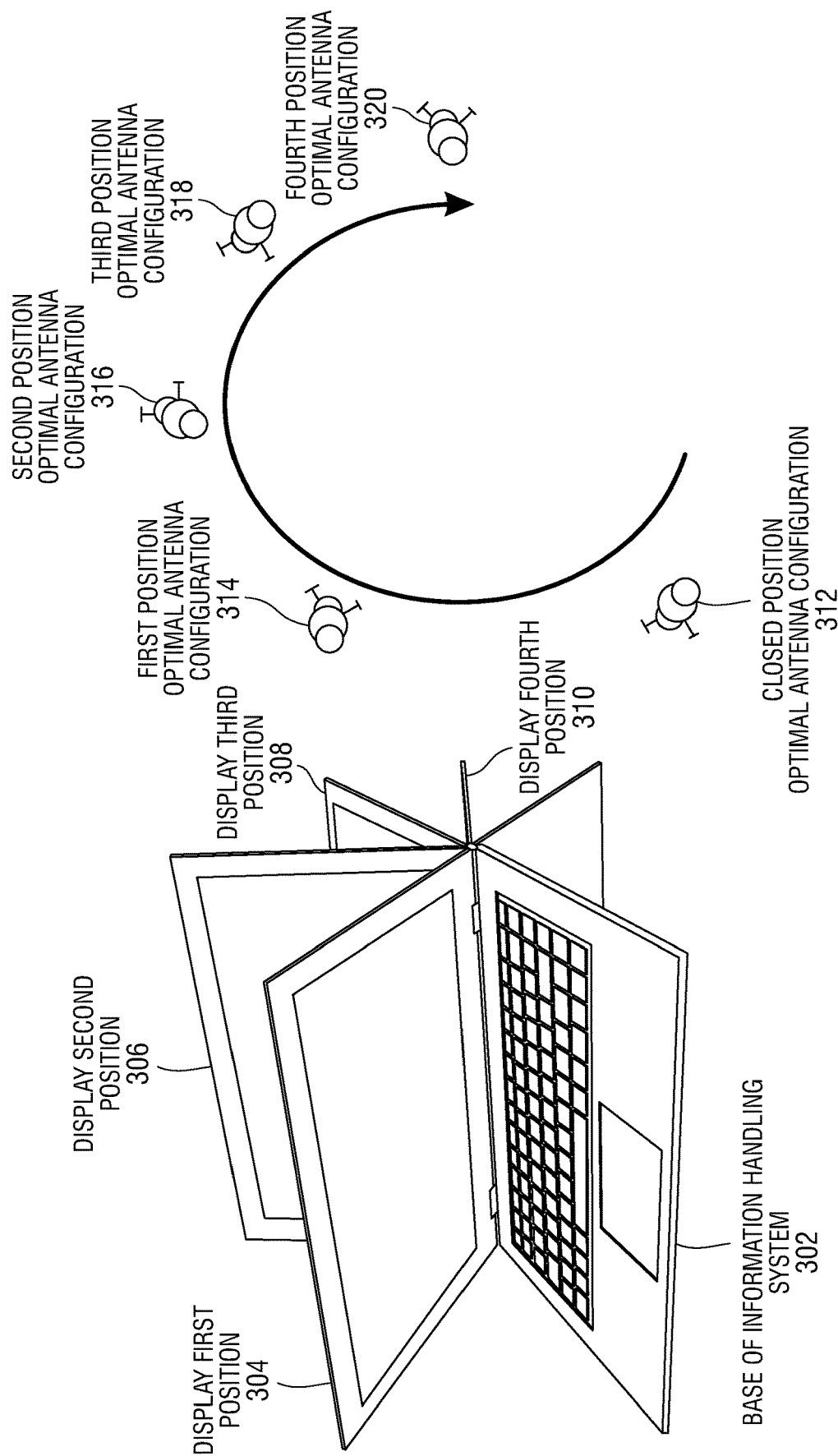
FIG. 3 is a graphical diagram illustrating a plurality of antenna radiation patterns according to an embodiment of the present disclosure.

FIG. 3 is a graphical diagram illustrating a plurality of antenna radiation patterns associated with a plurality of positional configurations according to an embodiment of the present disclosure. As shown in FIG. 3, an information handling system in an embodiment may include a base chassis 302 and a display chassis movably connected to the base chassis 302. For example, the display chassis may be capable of moving roughly 360 degrees from a closed position in which it abuts the keyboard side of the base chassis 302, to a tablet configuration in which the display side of the chassis points 180 degrees away from the keyboard side of the base chassis 302. Further, the display chassis may be capable of maintaining a number of intermediate positional configurations with respect to the base chassis 302, including, for example, a closed display position, display first position 304, display second position 306, display third position 308, display fourth position 310, and a display tablet position.

Each of the positions 304-310 as shown in FIG. 3 may be referred to herein as positional configurations or usage modes. For example, usage modes and/or positional configurations may include closed mode or configuration, open mode or configuration, and/or tablet mode or configuration. As the information handling system moves from one positional configuration to another, the quality of the signal may decrease unless the antenna radiation pattern is also altered. As such, the controller or microcontroller may receive an indication of a change in positional configuration or a change in signal quality if either of those conditions arises.

A transceiving antenna may be located within either or both of the display chassis and/or the base chassis 302 in an embodiment. The location of the transceiving antenna within a base chassis 302 in an embodiment may cause fluctuations in quality of a signal transceived from such an antenna as the display chassis rotates between position configurations. For example, as the display chassis rotates from a closed position, through the first through fourth positions 304-310, and toward a tablet configuration, signal quality parameters (e.g. RSSI, SNR, BER, MCS, or other performance factors) may fluctuate. As described above with respect to FIG. 2, the tuning and phase shift network may select an optimal radiation pattern of a WLAN antenna or WWAN antenna within the base chassis associated with current positional configurations and potentially improve RSSI, SNR, BER MCS or other performance factors. As such, each different positional configuration of the display chassis may be associated with a different optimal antenna configuration. For example, a closed position in which the display side of the display chassis abuts the keyboard side of the base chassis 302 may be associated with a closed position optimal antenna configuration having a radiation pattern 312. As another example, the display first position 304 may be associated with the first position optimal antenna configuration having a radiation pattern 314. As another example, the display second position 306 may be associated with the second position optimal antenna configuration having a radiation pattern 316. As another example, the display third position 308 may be associated with the third position optimal antenna configuration having a radiation pattern 318. As yet another example, the display fourth position 310 may be associated with the fourth position optimal antenna configuration having a radiation pattern 320. Further embodiments may also include optimal antenna configurations having different or similar patterns associated with a closed display position and/or a tablet display position. Radiation patterns 312-320 are shown only for explanatory purposes to show the changing optimal radiation patterns with respect to positional configurations. The radiation patterns 312-320 may not represent actual antenna patterns that may be used or experienced in the various embodiments herein.

Each of the positional configurations 304-310 and positional optimal antenna configurations 312-320 illustrated in FIG. 3 are example embodiments and further positional configurations and optimal antenna configurations are contemplated. Further, the association between any positional configuration and any optimal antenna configuration may be preset prior to movement of the display chassis with respect to the base chassis 302, or may be made heuristically in response to a detected change in positional configuration of the display chassis with respect to the base chassis 302. As such, the optimal antenna configuration associated with a positional configuration may change over time, as the information handling system moves geographically, or as the characteristics of transceiving communication links varies. Embodiments of the present disclosure may address these variable conditions by receiving one or more measurements of the current operating conditions of the information handling system and adaptively determining the most optimal antenna pattern for those circumstances using an antenna pattern training method.

Figure 4:
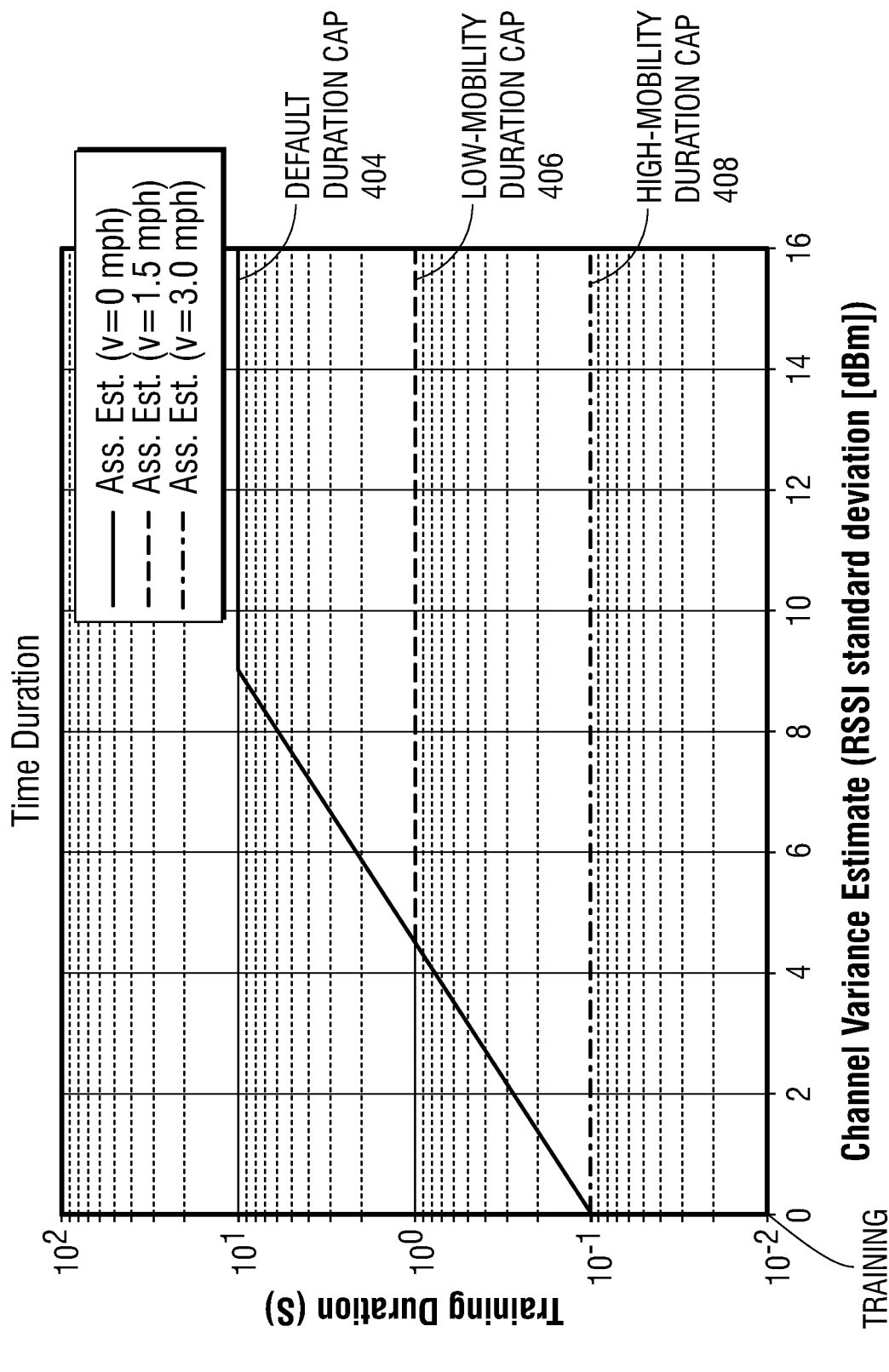
FIG. 4 is a graphical illustration of an estimated training duration plot according to an embodiment of the present disclosure.

FIG. 4 is a graphical illustration of an estimated training duration plot for use in choosing an antenna training method according to an embodiment of the present disclosure. A heuristic antenna pattern training system in an embodiment of the present disclosure may operate to test a plurality of possible antenna configurations to determine the most optimal antenna configuration for current operational conditions. Such testing may involve transceiving from an antenna according to a first pattern, testing one or more signal quality parameters (e.g. RSSI) on the link transceived according to the first pattern, repeating these steps for each available antenna pattern, then identifying the pattern associated with the highest signal quality parameter as the most optimal.

The link quality associated with each of these antenna patterns may be affected by one or more environmental factors or operating conditions. If the environmental factors or operating conditions do not change between the testing of the first antenna pattern and the next antenna pattern, comparison of the link qualities associated with each pattern may provide a clear indication of which of those antenna patterns will likely yield the highest quality link while the environmental factors or operating conditions remain the same. In contrast, if the environmental factors or operating conditions change between the testing of the first antenna pattern and the next antenna pattern, comparison of the link qualities will provide a less accurate determination of the optimal antenna pattern, because the change in environmental factors or operating conditions may affect the link quality more than the alteration of the antenna patterns. For example, movement of objects or signals causing interference or changes in air conditions, among other factors, may affect a change in the amount of scatter the signal undergoes. In such a scenario, taking more measurements over a longer period of time may provide enough data to isolate the effect of the alteration of the antenna patterns from the effect of the environmental factors or operating conditions (e.g. scattering) on the link quality, and to then identify an optimal antenna pattern. Thus, as the impact of the environmental factors or operating conditions (e.g. scatter) on signal quality increases, so too may the time required to test the plurality of antenna patterns increase. Such environmental factors and/or operating conditions of the transceiving antenna may include, but not be limited to path loss, shadowing/lognormal fading, Rayleigh fading, body obstruction, positional orientation of the information handling system, interference, and measurement noise.

In order to determine the magnitude of the impact of the environmental factors or operating conditions on signal quality, the heuristic antenna pattern training system in an embodiment may receive and/or analyze a history of RSSI measurements taken over time from the WLAN or WWAN module. RSSI variance may increase as the magnitude of the impact of the environmental factors or operating conditions on signal quality increases. As shown in the training duration plot 402 of FIG. 4, because the time required to test the plurality of antenna patterns may increase as the magnitude of the impact of the environmental factors or operating conditions on signal quality increases, the heuristic antenna pattern training system in an embodiment may associate a greater variance in RSSI with a greater training duration required to determine an optimal antenna pattern. For example, a smaller RSSI variance may be associated with little or no scattering, and greater RSSI variances may be associated with more highly scattered signals.

As shown in FIG. 4, the training duration plot 402 may plot one or more curvilinear lines representing relationships between RSSI variance (as shown in the X axis) and training duration (as shown in the Y axis). Each of the curvilinear lines in an embodiment may be associated with a different rate of geographic movement of the information handling system. For example, as shown in the training duration plot 402, the top curvilinear line may be associated with an estimated acceleration of zero miles per hour (0 mph), the middle curvilinear line may be associated with an estimated acceleration of one and one half miles per hour (1.5 mph), and the lower curvilinear line may be associated with an estimated acceleration of three miles per hour (3 mph).

Training or testing to determine a most optimal antenna configuration in an embodiment may be more effective in some scenarios than others. During training according to a non-dedicated method, signal quality may be decreased during a training session as suboptimal antenna configurations are tested. Consequently, the heuristic antenna pattern training system in an embodiment may limit or cap the amount of resources or time dedicated to a training method when a scenario in which training is expected to be less effective arises. For example, the heuristic antenna pattern training system may dedicate more time to training when the information handling system is stationary than when it is highly mobile. Some of the factors impacting RSSI variance may be caused by or worsened by increased mobility of the information handling system.

RSSI measurements of link quality may vary more widely based on the position of the information handling system with respect to a network wireless node, potentially interfering objects or other signals, and/or obstructing objects within a building (e.g. walls or furniture having differing compositions like brick, stucco, drywall, etc.). In fact, movement within a dense urban area can affect the way in which the signal undergoes the scattering effect (e.g. moving closer to a highly reflective or diffractive surface). As such, geographic movement of the information handling system alone can cause the quality of the link to change over time to a greater degree. In such a scenario, it may not be possible to gather data adequate to isolate the effect of the alteration of the antenna patterns from the effect of the environmental factors or operating conditions (e.g. scattering and movement of the information handling system) on the link quality, regardless of the period of time over which the training occurs. The heuristic antenna pattern training system in such a scenario may thus limit the amount of resources dedicated to identifying an optimal antenna pattern.

In order to determine whether geographic movement of the information handling system may be impacting the quality of the link to fluctuate, and thus devote fewer resources to identifying an optimal antenna pattern, the heuristic antenna pattern training system in an embodiment may receive accelerometer data or velocity data such as from a GPS circuit. Herein, accelerometer data may also include velocity data for description of mobility levels of an information handling system with antenna systems undergoing radiation pattern training via a heuristic antenna pattern training system according to embodiments herein. If the accelerometer data or velocity data indicates no or little geographic movement of the information handling system, or if no accelerometer data is received in an embodiment, the heuristic antenna pattern training system in an embodiment may refer to the training duration plot 402 to determine the training should not exceed the default duration cap 404 of 10 seconds. This default duration cap 404 is just an example value, and the actual value may be any measured value of time. Thus, operating according to the training duration plot 402, the heuristic antenna pattern training system in an embodiment may devote an increasing period of time to training for an optimal antenna pattern, up to a duration of ten seconds, if accelerometer data or velocity data has not been received or if accelerometer data or velocity data has been received and indicates a stationary state of the information handling system. This default duration cap 404 may apply across all RSSI variance values. In other words, although it may require a greater period of time to isolate an optimal antenna pattern as the RSSI variance increases, the heuristic antenna pattern training system in an embodiment may only dedicate more time to training up until the cap value of ten seconds.

If the accelerometer data or velocity data indicates high geographic movement of the information handling system, the heuristic antenna pattern training system in an embodiment may refer to the training duration plot 402 to determine the training should not exceed the high-mobility duration cap 408 of one tenth of one second. This high-mobility duration cap 408 is just an example value, and the actual value may be any measured value of time. As described above, the heuristic antenna pattern training system in a high-mobility scenario may limit the amount of resources dedicated to identifying an optimal antenna pattern, because it may not be possible to gather data adequate to isolate the effect of the alteration of the antenna patterns from the effect of the environmental factors or operating conditions (e.g. scattering and movement of the information handling system) on the link quality, regardless of the period of time over which the training occurs. Thus, operating according to the training duration plot 402, the heuristic antenna pattern training system in an embodiment may not devote an increasing period of time to training for an optimal antenna pattern, if accelerometer data indicates a high-mobility state of the information handling system. This high-mobility duration cap 408 may apply across all RSSI variance values which may be the minimum time allotted to training the system for antenna patterns in some embodiments.

If the accelerometer data or velocity data indicates low geographic movement of the information handling system, the heuristic antenna pattern training system in an embodiment may refer to the training duration plot 402 to determine the training should not exceed the low-mobility duration cap 406 of one second. This low-mobility duration cap 406 is just an example value, and the actual value may be any measured value of time. Although it may not be possible to gather data adequate to isolate the effect of the alteration of the antenna patterns from the effect of the environmental factors or operating conditions on the link quality in a high-mobility state, regardless of the period of time over which the training occurs, it may be possible to do so in a low-mobility state. However, the chance of success using such a method in a low-mobility state may be lesser than the chance of success using such a method in a stationary state. Because the likelihood of success is lower in a low-mobility state, the heuristic antenna pattern training system in an embodiment may dedicate fewer resources to training. Thus, operating according to the training duration plot 402, the heuristic antenna pattern training system in an embodiment may devote an increasing period of time to training for an optimal antenna pattern, up to a duration of one second, if accelerometer data indicates a low-mobility state of the information handling system. In such a way, the heuristic antenna pattern training system in an embodiment may tailor the amount of time spent identifying an optimal antenna pattern to the likelihood of such training improving signal quality.

Figure 5:
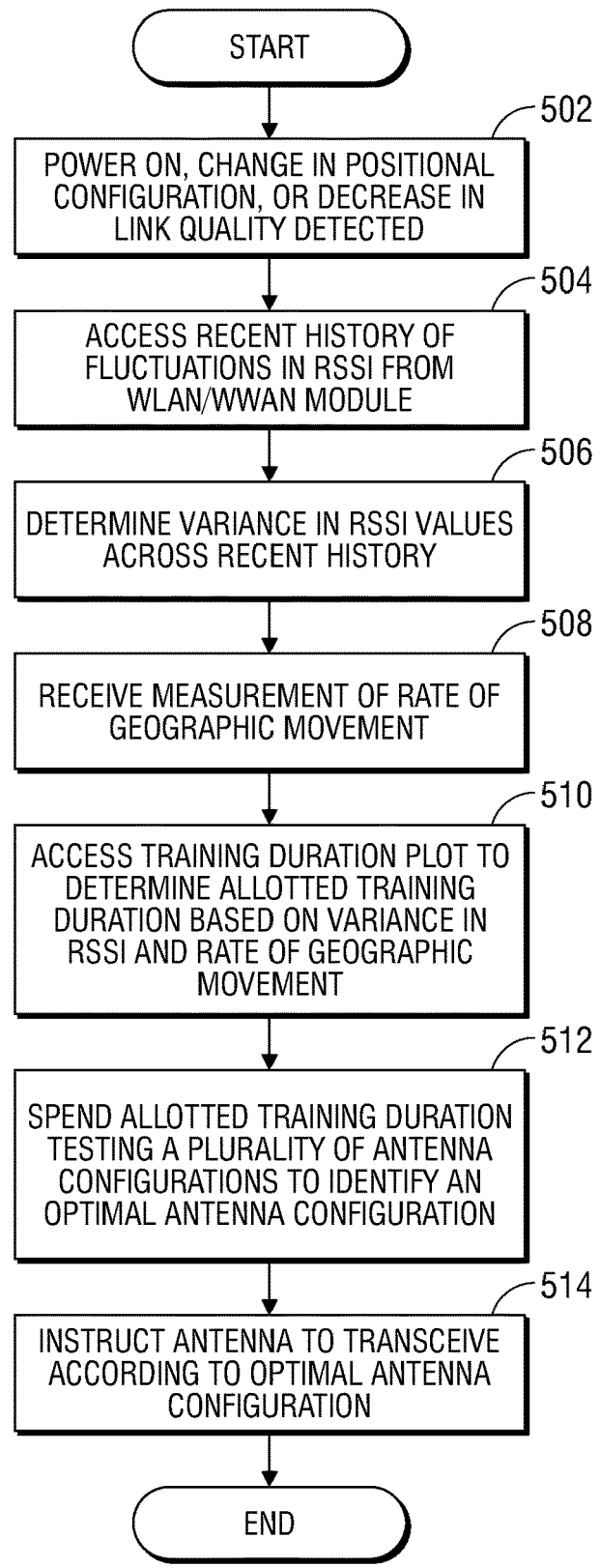
FIG. 5 is a flow diagram illustrating a method of determine an optimal antenna configuration during an allotted time period according to an embodiment of the present disclosure.

FIG. 5 is a flow diagram illustrating a method of determining an optimal antenna configuration during an allotted time period based on received inputs describing RSSI variance and/or measurement of geographic movement according to an embodiment of the present disclosure. As shown in FIG. 5 at block 502, the heuristic antenna pattern training system in an embodiment may receive an indication that the information handling system has been powered on, an indication that the information handling system has changed its positional configuration, or that a decrease in link quality has been detected. For example, in an embodiment described with reference to FIG. 2 above, the heuristic antenna pattern training system 202 may receive an indication of the information handling system being powered on from the embedded controller 216, and/or may receive an indication from the WLAN module 208 that the RSSI values (or other link quality parameters) for a link transceiving from the WLAN antenna 222 have decreased below a threshold value. In other embodiments, the heuristic antenna pattern training system 202 may systematically or periodically poll the WLAN module 208 to receive RSSI (or other link quality) values, and the comparison of RSSI values over time resulting in a determination that link quality has decreased may be performed by the heuristic antenna pattern training system 202 itself.

In still other embodiments, the heuristic antenna pattern training system 202 may receive an indication from the embedded controller 216 that the information handling system has changed positional configurations. For example, with reference to an embodiment described in FIG. 3, above, the display of the information handling system may have moved from one of a closed configuration, display first position 304, a display second position 306, a display third position 308, a display fourth position 410, and a tablet configuration, to another one of these positions or configurations.

At block 504, in an embodiment, the heuristic antenna pattern training system may access recent history of fluctuations in RSSI of a wireless link from the WLAN/WWAN module. The heuristic antenna pattern training system in an embodiment may perform this step in response to receiving an indication of powering on, change in positional configuration, or decrease in link quality in some embodiments. In other embodiments, the heuristic antenna pattern training system may perform this action periodically or automatically, without being prompted by receipt of any of the indications listed in block 502.

The heuristic antenna pattern training system in an embodiment may determine a variance in RSSI values across recent history at block 506. In some embodiments the variance in RSSI values over time may be recorded or stored at the WLAN module or WWAN module, and the heuristic antenna pattern training system may not perform any determination of the variance in RSSI. Rather, the heuristic antenna pattern training system in such an embodiment may access or receive the recorded or stored variance in RSSI values over time from the WLAN module or WWAN module. The heuristic antenna pattern training system in an embodiment may receive and/or analyze a history of RSSI measurements taken over time in order to determine the magnitude of the impact of the environmental factors or operating conditions on signal quality. RSSI variance may increase as the magnitude of the impact of the environmental factors or operating conditions on signal quality increases.

At block 508, in an embodiment, the heuristic antenna pattern training system may receive a measurement of the rate of geographic movement of the information handling system. In an embodiment, the rate of geographic movement of the information handling system may be measured by an accelerometer (e.g. accelerometer within a GPS circuit). For example, in an embodiment described with reference to FIG. 2, the heuristic antenna pattern training system 202 may receive a measurement of the rate of geographic movement of the information handling system from the embedded controller 216, which may be operatively connected to a GPS circuit or accelerometer or other sensor providing measurements of mobility of the information handling system.

As described herein, training or testing to determine a most optimal antenna configuration in an embodiment may be more effective in some scenarios than others. RSSI measurements of link quality vary more widely based on the position of the information handling system with respect to a network wireless node, potentially interfering objects or other signals, and/or obstructing objects within a building (e.g. walls or furniture having differing compositions like brick, stucco, drywall, etc.). In fact, movement within a dense urban area can affect the way in which the signal undergoes the scattering effect (e.g. moving closer to a highly reflective or diffractive surface). As such, geographic movement of the information handling system alone can cause the quality of the link to change over time to a greater degree. In such a scenario, it may not be possible to gather data adequate to isolate the effect of the alteration of the antenna patterns from the effect of the environmental factors or operating conditions (e.g. scattering and movement of the information handling system) on the link quality, regardless of the period of time over which the training occurs.

The heuristic antenna pattern training system in an embodiment may access instructions over training durations allowed, such that may result in training durations depicted in the training duration plot above, to determine an allotted training duration based on variance in RSSI and rate of geographic movement at block 510. For example, the heuristic antenna pattern training system in an embodiment described above with reference to FIG. 4 may allow a training duration similar to the training duration plot 402, and determine whether to the top curve associated with an estimated acceleration of 0 mph (stationary), the middle curve associated with an estimated acceleration of 1.5 mph (low-mobility), or the lower curve associated with an estimated acceleration of 3 mph (high-mobility) will be permitted based on the measured rate of geographic movement of the information handling system received at block 508. In some embodiments, control over training durations allowed for testing each available radiation pattern may be equally split among the available patterns, or some may be more likely to be used given configuration of the reconfigurable information handling system and those antenna patterns may be allotted more training time. In some embodiments, the heuristic antenna pattern training system may then identify a point on the chosen curvilinear line corresponding to the variance in RSSI values received or determined at block 506, and identify the training duration value associated with that point to determine the time that should be allotted to training the antenna pattern. In other embodiments, a cap may be implemented as reflected in the curvilinear lines based on the received mobility data from an accelerometer or other velocity data to cap the time allowed to conduct training. In the latter case, the variance experienced during training may vary from any measurements taken, but the training duration may be adjusted based on data indicating mobility levels of the information handling system.

At block 512, the heuristic antenna pattern training system in an embodiment may devote the allotted time duration to testing a plurality of antenna configurations to identify an optimal antenna configuration in some embodiments. In other embodiments, the cap on testing duration may be applied to the training based on the received mobility data. A heuristic antenna pattern training system in an embodiment of the present disclosure may operate to test a plurality of possible antenna configurations to determine the most optimal antenna configuration for current operational conditions, including but not limited to the current positional configuration of the information handling system. Such testing may involve transceiving from an antenna according to a first pattern, testing one or more signal quality parameters (e.g. RSSI) on the link transceived according to the first pattern, repeating these steps for each available antenna pattern, then identifying the pattern associated with the highest signal quality parameter as the most optimal. The link quality associated with each of these antenna patterns may be affected by one or more environmental factors or operating conditions. In a scenario in which multiple environmental factors or operating conditions may be affecting signal quality, as indicated by a wider variance in measured RSSI, taking more measurements over a longer period of time may provide enough data to isolate the effect of the alteration of the antenna patterns from the effect of the environmental factors or operating conditions (e.g. scattering) on the link quality, and to then identify an optimal antenna pattern. Thus, as the impact of the environmental factors or operating conditions (e.g. scatter) on signal quality increases, so too may the time required to test the plurality of antenna patterns.

Because the effectiveness of training may be greater in certain scenarios than in others, and because signal quality may be decreased during a training session as suboptimal antenna configurations are tested, the heuristic antenna pattern training system in an embodiment may balance the likely advantages of antenna pattern testing with the disadvantages of decreased signal strength during the training session. Consequently, the heuristic antenna pattern training system in an embodiment may limit or cap the amount of resources or time dedicated to a training method when a scenario in which training is expected to be less effective arises. For example, the heuristic antenna pattern training system may dedicate more time to training when the information handling system is stationary than when it is highly mobile. After the heuristic antenna pattern training system in an embodiment determines at block 510 the best amount of time to devote to training in order to strike the balance described above, the heuristic antenna pattern training system may then limit the time spent training the antenna to the allotted time.

At block 514, in an embodiment, the heuristic antenna pattern training system may instruct the antenna to transceive according to the optimal antenna configuration. Once the optimal antenna configuration is identified through antenna pattern training at block 512, the heuristic antenna pattern training system may instruct the antenna to change its antenna pattern to the identified most optimal pattern associated with the highest link quality measured during training. This instruction may be transmitted to a WLAN antenna, or a WWAN antenna.

Figure 6:
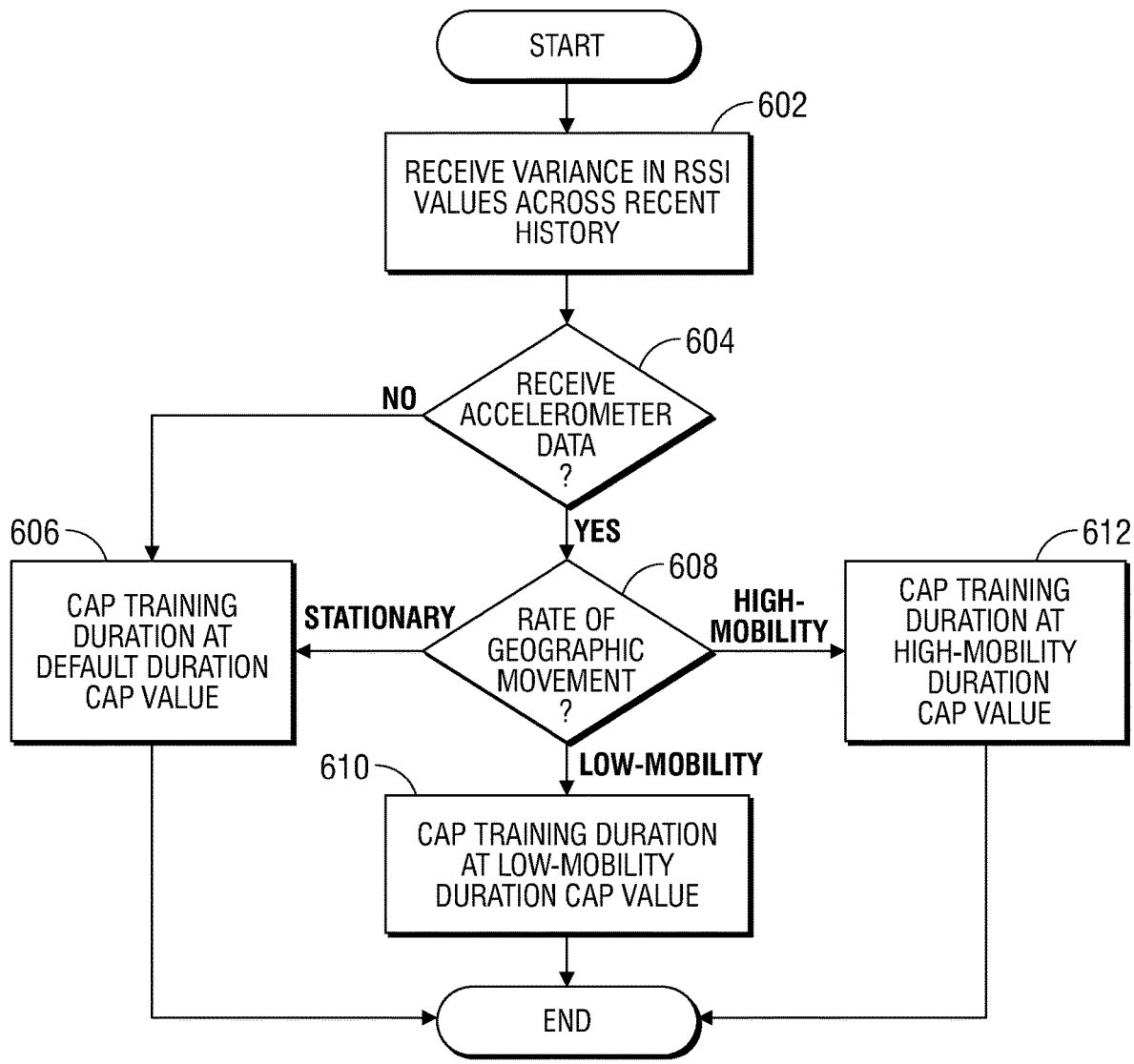
FIG. 6 is a flow diagram illustrating a method of determining duration of a method to determine an optimal antenna configuration according to an embodiment of the present disclosure.

FIG. 6 is a flow diagram illustrating a method of determining duration of a method to determine an optimal antenna configuration based on received measurements of geographic movement, general movement (such as local movements), and RSSI variance according to embodiments of the present disclosure. As described herein, a heuristic antenna pattern training system in an embodiment of the present disclosure may operate to test a plurality of possible antenna configurations by transceiving from an antenna according to a first pattern, testing one or more signal quality parameters (e.g. RSSI) on the link transceived according to the first pattern, repeating these steps for each available antenna pattern, then identifying the pattern associated with the highest signal quality parameter as the most optimal.

As described herein, training or testing to determine a most optimal antenna configuration in an embodiment may be more effective in some scenarios than others. During training according to a non-dedicated method, signal quality may be decreased during a training session as suboptimal antenna configurations are tested. Consequently, the heuristic antenna pattern training system in an embodiment may limit or cap the amount of resources or time dedicated to a training method when a scenario in which training is expected to be less effective arises. The method described with reference to FIG. 6 allows the heuristic antenna pattern training system in an embodiment to determine the appropriate limit or cap for the amount of time to dedicate to training the antenna based on multiple scenarios.

At block 602, in an embodiment, the heuristic antenna pattern training system may receive values of RSSI variance over time. In an embodiment, the heuristic antenna pattern training system may access or receive values of RSSI variance over time stored at or recorded by the WLAN module or WWAN module. The heuristic antenna pattern training system in an embodiment may receive and/or analyze a history of RSSI measurements taken over time in order to determine the magnitude of the impact of the environmental factors or operating conditions on signal quality.

At block 604, the heuristic antenna pattern training system in an embodiment may determine whether accelerometer data or other velocity data has been received for the information handling system. If accelerometer data has been received, the heuristic antenna pattern training system in an embodiment may dedicate more or less time to antenna training, depending on the measured rate of geographic movement of the information handling system. For example, the heuristic antenna pattern training system may provide a higher cap on time for training when the information handling system is stationary than when it is highly mobile. If the heuristic antenna pattern training system in an embodiment does not receive accelerometer data, the method may proceed to block 606. If the heuristic antenna pattern training system in an embodiment receives accelerometer data, the method may proceed to block 608, where the training duration cap may be altered based on the received data.

At block 606, in an embodiment in which the heuristic antenna pattern training system has not received accelerometer data, or has received accelerometer data indicating the information handling system is currently stationary, the heuristic antenna pattern training system may cap the training duration at the default duration cap value. For example, in an embodiment described with reference to FIG. 4, if the heuristic antenna pattern training system does not receive accelerometer data or the accelerometer data indicates no or little geographic movement of the information handling system, the heuristic antenna pattern training system in an embodiment may implement instructions limiting the training duration as reflected in the training duration plot 402 to determine the training should not exceed the default duration cap 404 of 10 seconds. Thus, operating according to the training duration plot 402, the heuristic antenna pattern training system in an embodiment may devote an increasing period of time to training for an optimal antenna pattern, up to a duration of ten seconds, if accelerometer data has not been received or if accelerometer data has been received and indicates a stationary state of the information handling system. The method may then end.

At block 608, in an embodiment in which the heuristic antenna pattern training system has received accelerometer data, the heuristic antenna pattern training system may determine the rate of geographic movement, local movement via acceleration events such as repeated or periodic acceleration events, or other velocity or acceleration of the information handling system.

Movement of the information handling system within or between networks can affect the way in which the signal undergoes the scattering effect (e.g. moving closer to a highly reflective or diffractive surface), interference encountered, line of sight with the node, and other factors that may affect signal quality. As such, geographic movement or local movement of the information handling system alone can cause the quality of the link to change over time to a greater degree than a lack of geographic movement. In such a scenario, it may not be possible to gather data adequate to isolate the effect of the alteration of the antenna patterns from the effect of the environmental factors or operating conditions (e.g. scattering and movement of the information handling system) on the link quality, regardless of the period of time over which the training occurs. The heuristic antenna pattern training system in such a scenario may thus limit the amount of resources dedicated to identifying an optimal antenna pattern, dependent upon the speed of movement. If the information handling system is stationary, the method may proceed to block 606, described above, and the heuristic antenna pattern training system may cap the training duration at the default duration cap value. If the accelerometer data indicates a low-mobility state (e.g. 1.5 mph), the method may proceed to block 610. In another aspect, a low-mobility state may be indicated by infrequent or non-periodic accelerometer event feedback such that overall movement does not exceed a level of acceleration events over time. If the accelerometer data indicates a high-mobility state (e.g. 3 mph), the method may proceed to block 612.

At block 610, the heuristic antenna pattern training system in an embodiment may cap the training duration at the low-mobility duration cap value. For example, in an embodiment described with reference to FIG. 4, the heuristic antenna pattern training system receive instructions of a cap level in accordance with or may refer to the training duration plot 402 to associate the indication of low-mobility with the middle curvilinear line indicating an estimated acceleration of 1.5 mph, and determine the training should not exceed the low-mobility duration cap 406 of one second. Because the chance of success of improving link quality through antenna pattern training in a low-mobility state may be lesser than the chance of success using such a method in a stationary state, the heuristic antenna pattern training system in an embodiment may dedicate fewer resources to training than it would in a stationary state. Thus, operating according to the training duration plot 402, the heuristic antenna pattern training system in an embodiment may devote an increasing period of time to training for an optimal antenna pattern, up to a duration of one second, if accelerometer data indicates a low-mobility state of the information handling system.

At block 612, the heuristic antenna pattern training system in an embodiment may cap the training duration at the high-mobility duration cap value. For example, in an embodiment described with reference to FIG. 4, the heuristic antenna pattern training system may receive instructions of a cap level in accordance with or refer to the training duration plot 402 to associate the indication of high-mobility with the lowest curvilinear line indicating an estimated acceleration of 3 mph, and determine the training should not exceed the high-mobility duration cap 408 of one tenth of one second. As described above, the heuristic antenna pattern training system in a high-mobility scenario may limit the amount of resources dedicated to identifying an optimal antenna pattern, because it may not be possible to gather data adequate to isolate the effect of the alteration of the antenna patterns from the effect of the environmental factors or operating conditions (e.g. scattering and movement of the information handling system) on the link quality, regardless of the period of time over which the training occurs. Thus, operating according to the training duration plot 402, the heuristic antenna pattern training system in an embodiment may not devote an increasing period of time to training for an optimal antenna pattern, if accelerometer data indicates a high-mobility state of the information handling system. In such a way, the heuristic antenna pattern training system in an embodiment may tailor the amount of time spent identifying an optimal antenna pattern to the likelihood of such training improving signal quality. The method may then end.

The blocks of the flow diagrams of FIGS. 5-6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A wireless adapter front end for an information handling system comprising:
   a wireless adapter for communicating content on a transceiving antenna via a wireless link, wherein the transceiving antenna is configurable to have a plurality of antenna radiation patterns;
   a controller executing instructions of a heuristic antenna pattern selection system to:
      determine a trigger input to trigger an assessment of antenna radiation pattern configuration and receive a measurement of RSSI variance of the wireless link;
      receive a measurement of a rate of mobility of the information handling system from accelerometer data or velocity data;
      determine an allotted training duration time period based on the received measurement of RSSI variance of the wireless link and a measurement of the rate of mobility; and
      configure the wireless adapter to an optimal antenna pattern having a highest quality link performance indicator determined during the identified training duration time period.

2. The wireless adapter front end of claim 1, wherein the trigger input indicates a change in positional configuration to trigger the assessment of antenna radiation pattern configuration.

3. The wireless adapter front end of claim 1, wherein the trigger input indicates a power on event of the wireless adapter to trigger the assessment of antenna radiation pattern configuration.

4. The wireless adapter front end of claim 1, wherein the trigger input is a detected decrease in signal strength reaching a threshold level to trigger the assessment of antenna radiation pattern configuration.

5. The wireless adapter front end of claim 1 further comprising:
   the controller executing instructions of a heuristic antenna pattern selection system to:
      cap the allotted training duration time period at less than one second if the received measurement of the rate of mobility of the information handling system indicates a high-mobility state.

6. The wireless adapter front end of claim 1 further comprising:
   the controller executing instructions of a heuristic antenna pattern selection system to:
      cap the allotted training duration time period at less than two seconds if the received measurement of the rate of mobility of the information handling system indicates a low-mobility state.

7. The wireless adapter front end of claim 1 further comprising:
   the controller executing instructions of a heuristic antenna pattern selection system to:
      cap the allotted training duration time period at ten seconds if the received measurement of the rate of mobility of the information handling system is zero.

8. A method for determining an optimal antenna radiation pattern comprising:
   communicating content on a transceiving antenna configurable to have a plurality of antenna radiation patterns via a wireless link;
   receiving a trigger input to trigger an assessment of antenna radiation pattern configuration;
   receiving a measurement of a rate of mobility of the information handling system, wherein the rate of mobility is determined from accelerometer data or velocity data;
   capping an allotted training duration time period based on the received measurement of the rate of mobility of the information handling system falling within a threshold range associated with a mobility state; and
   configure the wireless adapter to an optimal antenna pattern having a highest quality link performance indicator determined during the training duration time period.

9. The method for determining an optimal antenna radiation pattern of claim 8, wherein the trigger input indicates the information handling system has powered on.

10. The method for determining an optimal antenna radiation pattern of claim 8, wherein the trigger input indicates a change in positional configuration of the information handling system.

11. The method for determining an optimal antenna radiation pattern of claim 8, wherein the trigger input indicates a detected decrease in signal strength reaching a threshold level.

12. The method for determining an optimal antenna radiation pattern of claim 8 further comprising:

capping the allotted training duration time period at less than a first training duration time period if the received measurement of the rate of mobility of the information handling system reaches a threshold range indicating a high-mobility state.

13. The method for determining an optimal antenna radiation pattern of claim 12 further comprising:
capping the allotted training duration time period at less than a second training duration time period longer than the first training duration time period if the received measurement of the rate of mobility of the information handling system reaches a threshold range to indicate a low-mobility state.

14. The method for determining an optimal antenna radiation pattern of claim 8 further comprising:
capping the allotted training duration time period at a maximum training duration time period if the received measurement of the rate of geographic movement of the information handling system is zero.

15. A wireless adapter front end for an information handling system comprising:
a wireless adapter for communicating content on a transceiving antenna via a wireless link, wherein the transceiving antenna is configurable to have a plurality of antenna radiation patterns;
a controller executing instructions of a heuristic antenna pattern selection system to:
receive a trigger input indicating decreased signal strength, a change in positional configuration, or the information handling system has powered on;
receive a measurement of a rate of mobility of the information handling system, wherein the rate of mobility is determined from accelerometer data or velocity data;
configure the wireless adapter to an optimal antenna pattern having a highest quality link performance indicator determined during a capped training duration time period, where the capped duration time period is selected based on the received measurement of the rate of mobility of the information handling system.

16. The wireless adapter front end of claim 15 further comprising:
the controller executing instructions of a heuristic antenna pattern selection system to:
cap the allotted training duration time period at less than one second if the received measurement of the rate of mobility of the information handling system indicates a high-mobility state.

17. The wireless adapter front end of claim 16, wherein the received measurement of the rate of mobility of the information handling system is equal to or greater than a threshold miles per hour indicating a high-mobility state.

18. The wireless adapter front end of claim 15 further comprising:
the controller executing instructions of a heuristic antenna pattern selection system to:
cap the allotted training duration time period at less than two seconds if the received measurement of the rate of mobility of the information handling system indicates a low-mobility state.

19. The wireless adapter front end of claim 18, wherein the received measurement of the rate of mobility of the information handling system is equal to or less than a threshold level of acceleration events to indicate a low-mobility state.

20. The wireless adapter front end of claim 15 further comprising:
the controller executing instructions of a heuristic antenna pattern selection system to:
cap the allotted training duration time period at a maximum time period duration if the received measurement of the rate of mobility of the information handling system is zero.

\* \* \* \* \*